Jan. 16, 1968 A. R. MAXEY 3,363,852

COAXIAL TAPE TRANSPORT APPARATUS

Filed March 21, 1966 3 Sheets-Sheet 1

INVENTOR.
ALEXANDER R. MAXEY.

BY
FOWLER, KNOBBE
& GAMBRELL
ATTORNEYS.

INVENTOR.
ALEXANDER R. MAXEY
BY
FOWLER, KNOBBE
& GAMBRELL
ATTORNEYS.

Jan. 16, 1968 A. R. MAXEY 3,363,852

COAXIAL TAPE TRANSPORT APPARATUS

Filed March 21, 1966 3 Sheets-Sheet 3

INVENTOR.
ALEXANDER R. MAXEY
BY
FOWLER, KNOBBE & GAMBRELL
ATTORNEYS.

United States Patent Office 3,363,852

Patented Jan. 16, 1968

3,363,852

COAXIAL TAPE TRANSPORT APPARATUS

Alexander R. Maxey, Newark, Calif., assignor by mesne assignments, to Allan R. Fowler, Orange, Calif., trustee Filed Mar. 21, 1966, Ser. No. 535,983
7 Claims. (Cl. 242—55.12)

ABSTRACT OF THE DISCLOSURE

A tape transport apparatus including a lower stationary support and an upper movable panel, the panel and support each having a tape reel mounted thereon in coaxial relationship. The panel and upper reel thereon can be moved between the tape operating position and a position wherein the lower tape reel can be loaded into and the tape threaded through the apparatus. Drive means are provided to differentially drive the reels.

This invention relates to magnetic tape recording and playback equipment, and, more specifically, relates to tape transport apparatus in which the tape supply and take-up reels are coaxially mounted.

In order to reduce the overall size of tape recording and playback equipment, particularly portable equipment, it is desirable to mount the tape supply and take-up reels one over the other. However, when the reels are in adjacent coaxial position, the lower reel is practically inaccessible, so handling and threading of the tape is difficult.

This invention provides an improved device for coaxially mounting the reels in a manner that facilitates handling and threading of the tape. Generally, in accordance with this invention, a tape transport includes a lower stationary support member and an upper movable panel each of which has a tape reel hub rotatably mounted on its top side. The movable panel is mounted over the support member for pivotal movement between a loading position away from the lower hub and an operating position overlaying the lower hub with the hubs in coaxial relationship. Drive means are provided for differentially rotating the hubs. The upper hub drive means includes a motor below the lower hub and means extending through the lower hub for releasably coupling the motor to the upper hub responsive to movement of the pivotal panel to the operative position.

With the panel pivoted to the loading position, a tape reel can be loaded on the lower hub and the tape threaded through the capstan and head assembly of the recorder without any interference from the upper hub or panel. The panel can then be pivoted to the operative position so that the upper reel is on top and easily accessible for threading the tape on it. As neither reel need be moved after it is threaded, no slack need be left nor does any develop. Moreover, it is convenient to load, thread, and unload both reels without damage to the tape, reels, or equipment and without having to handle two reels simultaneously.

In an exemplary embodiment of the invention, the upper hub drive shaft terminates interior of the lower hub and has means at its upper end which cooperate with means depending from the upper hub to rotationally couple the drive shaft to the upper hub when the upper panel is pivoted to the operative position.

Further, in an exemplary embodiment the movable plate has a reel hold-down means mounted on its underside to engage and rotate with the lower reel. This hold-down means retains the reel against any possible axial movement during operation, without the use of conventional removable hold-down knobs which compound the difficulties of loading and unloading reels.

These and other objects and features of this invention will be apparent from the following detailed description when read with reference to the accompanying drawings in which.

Figures 1, 5:
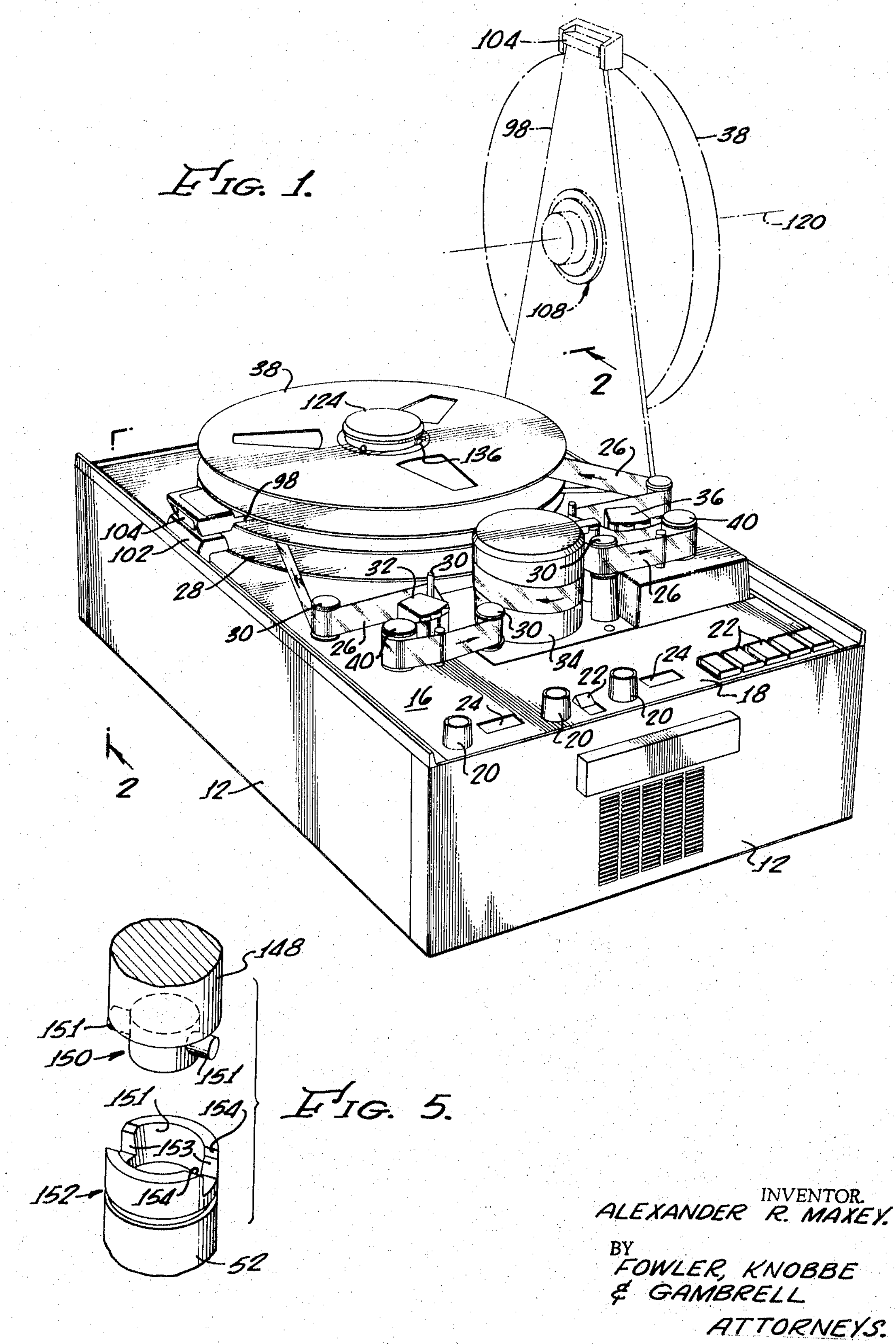
FIG. 1 is a perspective view of an exemplary tape recorder including a tape transport apparatus constructed in accordance with this invention.

Referring to FIG. 1, an exemplary portable video tape recorder includes a base or cabinet having four upright sides 12, a bottom plate 14 (see FIG. 2), and a top or front deck 16. A control panel 18 along one edge of the deck includes a plurality of knobs 20, switches 22, and lights 24 for controlling the tape recorder. A tape transport apparatus feeds tape 26, e.g. in the direction of the arrows, from a lower tape supply reel 28 disposed immediately above the tape deck 16 past idlers 30 and a lower head assembly 32, around a scan assembly 34, past more idlers 30 and an upper head assembly 36 and onto a tape take-up reel 38 disposed in coaxial relationship over the supply reel 28. It should be understood, of course, that the direction of tape travel can be reversed. During recording and playback operation, the tape speed is carefully regulated by motor drive capstans 40.

Figure 2:
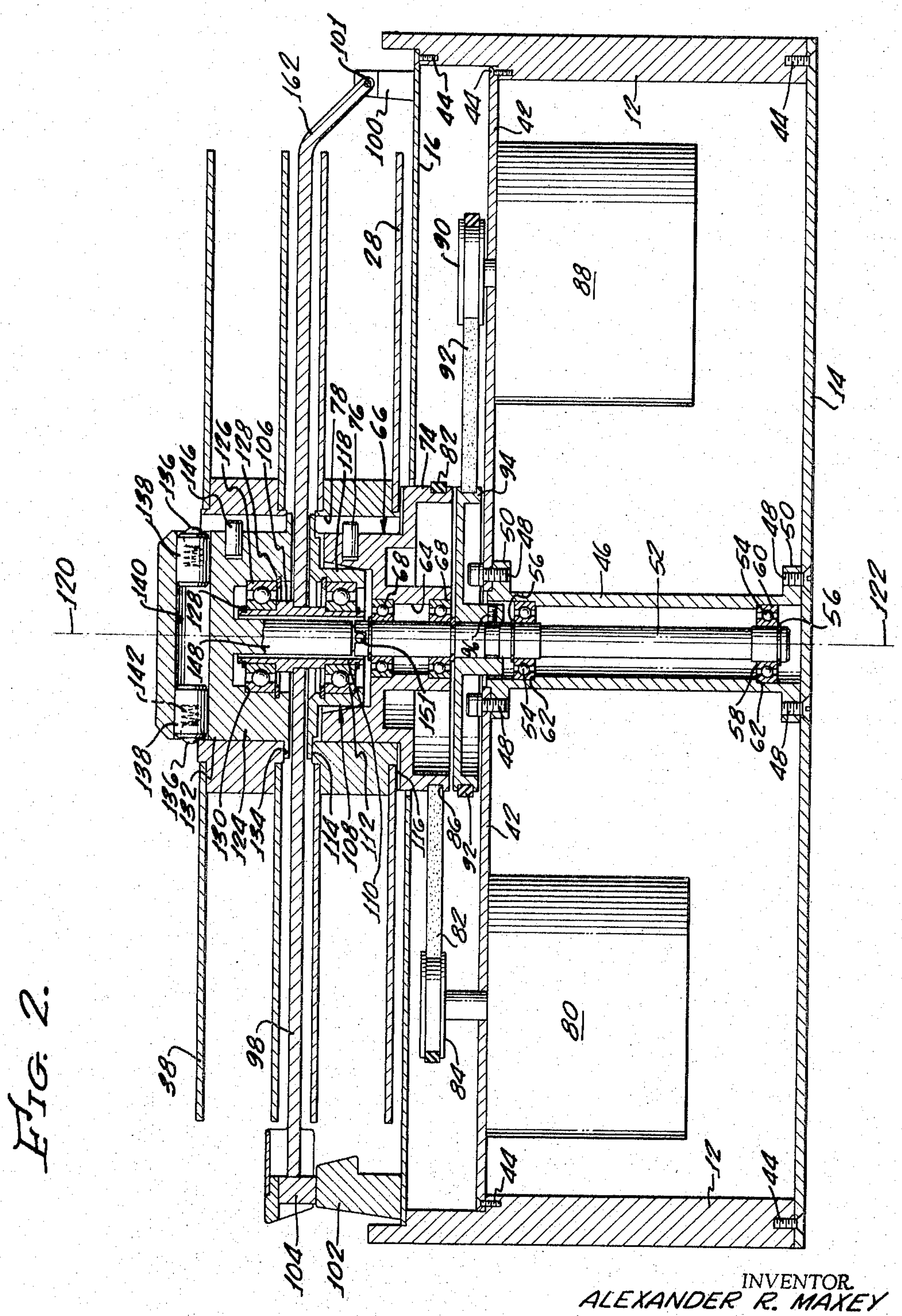
FIG. 2 is a vertical section through the tape transport apparatus taken generally along line 2—2 of FIG. 1 with the tape removed for clarity.

Referring now to FIG. 2, as well as to FIG. 1, a flat chassis plate 42 extends between the cabinet sides below and parallel to the deck 16, both the deck and the chassis plate being fixed to the cabinet by screws 44. An elongate cylindrical shaft housing 46 is fixed vertically between the chassis plate 42 and the bottom of the cabinet 14 by screws 48 threaded into a collar 50 at each of its ends. An elongate cantilevered drive shaft 52 is rotatably journalled in ball bearings 54 near each end of the housing. A locking clip 56 affixed to the drive shaft 52 engages one race 58 of each bearing and the other race 60 abuts an annular shoulder 62 in the internal wall of the shaft housing to retain the bearings in place.

The upper end portion of the drive shaft extends through the chassis plate and into the axial bore 64 of a lower tape supply hub 66. The lower hub 66 is supported on the drive shaft 52 by a pair of ball bearings 68 so that the hub and shaft can rotate differentially or independent of each other. A tape supply reel 28 fits snugly on the forward cylindrical portion 22 of the tape supply hub, and is supported on an enlarged diameter portion 74 of the hub. The reel is rotationally fixed to the hub by a stud 76 extending radially from the hub into an axial groove 78 in the reel. An electric motor 80 selectively rotates the hub through a belt 82 engaging a drive pulley 84 and a peripheral groove 86 in the enlarged diameter portion 74 of the lower hub. The belt 82 and motor 80 are concealed by the deck 16 in normal installation.

The drive shaft 52 is rotated by a second electric motor 88 similarly mounted beneath the chassis plate. The second motor is connected to the drive shaft through a drive pulley 90 and a belt 92 which engages a large diameter pulley 94 on the drive shaft disposed between the lower hub 66 and the chassis plate 42. A set screw 96 rotationally and axially fixes the pulley 94 on the drive shaft. The spacing between the lower hub and the pulley 94 and the spacing between the pulley 94 and the chassis plate is sufficient to assure independent free rotation of the drive shaft and lower hub.

Figures 3, 4:
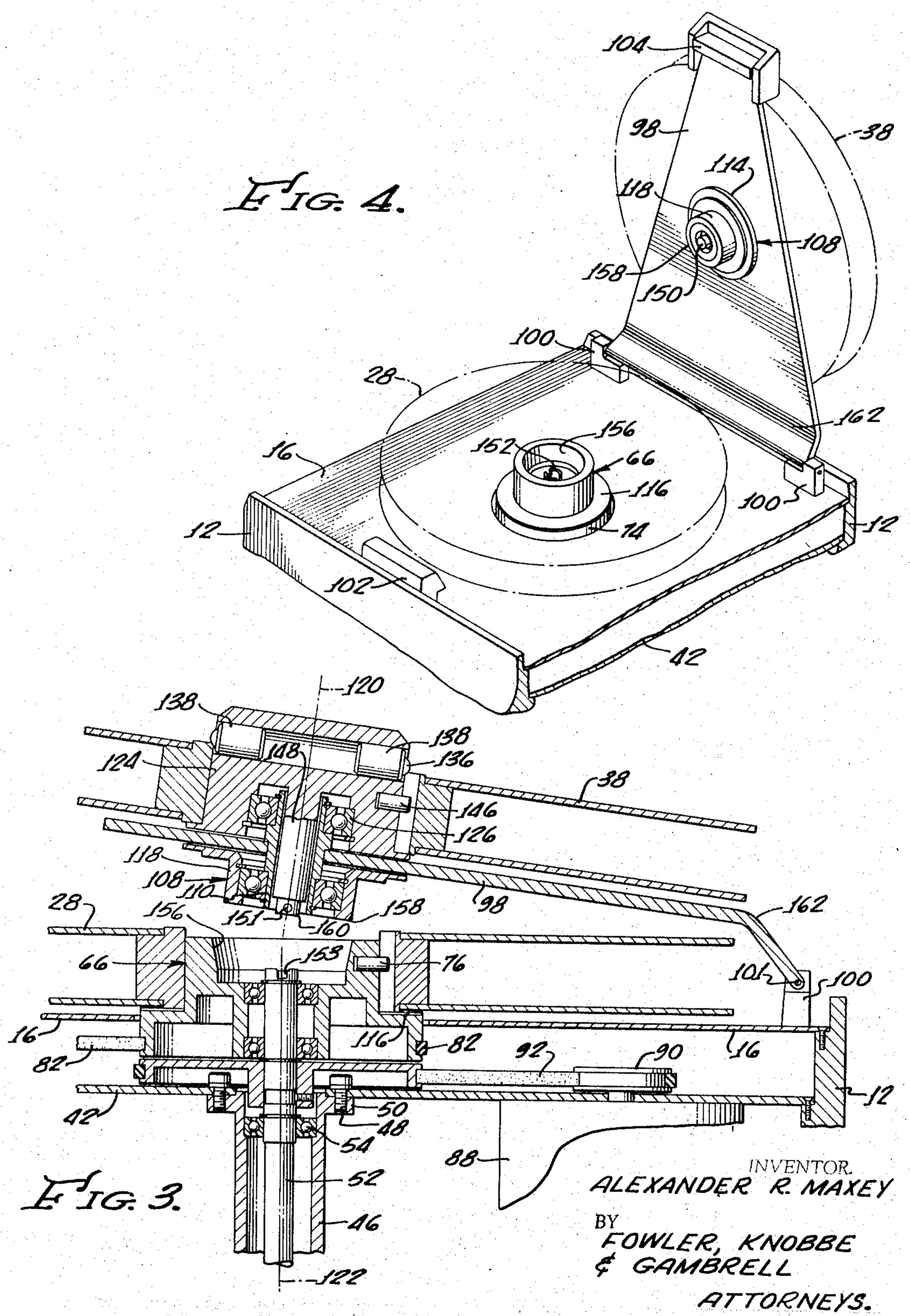
FIG. 3 is a partial section similar to FIG. 2 showing the movable plate and upper hub assembly pivoted partially away from the operative position.
FIG. 4 is a perspective view of the tape transport mechanism with the tape reels shown in phantom and the movable plate in the upright loading position; and, FIG. 5 is an enlarged partial perspective view of the drive train coupling.

An upper movable panel or plate 98 is mounted on the deck by a pair of upstanding brackets 100 for pivotal movement about an axis 101 parallel to the deck between a down or operative position as shown in FIG. 2 and an upright or loading position as shown in FIG. 4 and in phantom in FIG. 1. A support 102 mounted on the deck near the distal end of the movable plate supports the plate 98 in its operative position so that it is substantially parallel to the deck 16 and immediately overlays the lower tape reel 28 and hub 66. A catch 104 on the distal end of the plate releasably holds the plate in the down position. The plate 98 preferably pivots through an angle of at least about 90° so that the lower hub is easily accessible and so that the plate does not swing to the operative position from the loading position under its own weight.

A sleeve 106 which extends through the movable plate is press-fit or otherwise suitably fixed to the plate. A reel hold-down means 108 rotatably mounted around the lower end portion 110 of the sleeve by a ball bearing 112 includes an enlarged diameter upper flange 114 which extends out over and engages the upper surface of the tape supply reel 28 to hold the reel firmly in place on the lower hub when the movable plate is in the down or operative position. A resilient pad 116 beneath the tape reel permits some tolerance in reel thickness. A reduced diameter aligning portion 118 of the hold-down means extends into the lower hub axial bore to align the axis 120 of the sleeve with the axis 122 of the drive shaft 52, as will be described below.

A tape take-up hub 124 or upper tape hub is rotatably mounted on the sleeve 106 above the movable plate 98 by a ball bearing 126 held in place by retaining clips 128 and annular shoulders 130. The take-upp reel 38 fits snugly on the upper cylindrical portion 132 of the upper hub and rests on a lower enlarged diameter flange portion 134 adapted to position the reel. The reel is held in place on the take-up hub by retaining balls 136 which are urged radially outward to engage the upper edge of the reel. Each ball is received in a housing 138 fixed in a radial bore 140 in the hub and is urged outward by a compression spring 142 interior of the housing. The take-up reel is rotationally affixed to the hub 124 by a stud 146 in the same manner as the lower reel is fixed to the lower hub. The upper tape reel and the reel hold-down means 108 are spaced from the pivotal plate 98 sufficiently that each rotates without rubbing on the plate.

The upper hub 124 has a depending shaft 148 formed as an integral part of the hub. The depending shaft extends coaxially through the sleeve 106 and terminates at its lower end in a male pin coupling member 150 (see FIG. 5). The male coupling member has pins 151 which cooperate with slots 153 of a female coupling member 152 at the upper end of the drive shaft 52 to rotatingly fix the drive shaft to the depending shaft when the movable plate is in the operative position. Thus, with the movable plate in the operative position as shown in FIG. 2, the upper reel drive motor 88 may be energized to rotate the drive shaft 52, and the upper tape reel 38 and hub 124 independent of the lower hub 66 and reel 28. Similarly, the lower hub motor 80 may be energized to rotate the lower hub and reel independent of any rotation of the upper hub and reel. However, the reel hold-down means 108 which is in engagement with the lower reel will rotate with the lower reel.

Referring now particularly to FIGS. 3 and 4, the pivotal plate may be swung from its down position in which the plate is between the hubs which are coaxial, through an arc of at least about 90° and preferably more to an upright or loading position in which the lower reel 28 is readily accessible. As the plate 98 pivots away from the lower hub about its pivotal axis, the pins 151 leave the slots 153 so that the depending shaft 148 is uncoupled from the drive shaft 52. Similarly, as the plate 98 is moved back down to the operative position, the pins 151 re-engage in the slots 153, being assisted into rotational alignment by beveled edges 154 at the upper end of the slots (see FIG. 5). The upper portion of the supply hub bore wall 156 and the interior wall 57 of the female coupling 152 are each frusto-conical, converging in the downward direction, to form a cam surface which cooperates with the leading edge of the hold-down means and the leading edge of the male coupling, respectively, to align the axis 120 of the sleeve with the axis 122 of the drive shaft 52. Slight axial misalignment of the drive shaft 52 and depending shaft 148 can be taken into account by play in the bearing 126. Bevels on the leading edge of the male coupling 160 and reel hold-down 158 accommodate the angular movement between the upper and lower assemblies.

A portion 162 of the plate 98 near the pivot axis 101 is angularly offset so that the pivotal axis 101 of the plate is in about the same plane perpendicular to the drive shaft axis 122 as are the slots 153. Therefore, with the sleeve 106 and depending shaft 148 perpendicular to the movable plate 98 and the drive shaft 52 perpendicular to the chassis plate 42 and deck 16, the drive shaft and depending shaft will be axially aligned in the operative position and the pivotal plate will be parallel to the lower tape reel, deck and chassis plate.

The plate may be swung from one position to the other independent of whether or not reels are mounted on the hubs. Thus, for example, the plate may be swung to the upper position while a tape supply reel is placed on the lower hub and the tape threaded through the head and capstan assemblies. The plate may then be lowered to the operative position for threading the tape onto the take-up reel. In this manner, each reel is readily accessible while it is being handled, and yet the reels need not be moved away from or towards each other while tape interconnects them.

While the above description has made particular reference to the front side of the recorder as the top and the back side as the bottom for convenience in description, it should be understood that the recorder need not be installed with the deck horizontal.

I claim:

1. In a tape transport apparatus, coaxial mounting and drive means for tape reels comprising:

(a) a stationary support member having a lower reel hub mounted on its top side for rotation about an axis;

(b) a panel having a sleeve fixed perpendicularly thereto and extending above the top side of the panel, an upper reel hub rotatably mounted on said sleeve on the top side of the panel and having a depending shaft extending into the sleeve;

(c) means mounting the panel for pivotal movement between a loading position in which the pivotal panel is pivoted away from the lower hub sufficiently to permit loading of a reel thereon, and an operative position in which the pivotal panel overlays the lower hub with the upper hub accessible on top of the pivotal plate, the hub axes being substantially aligned in the operative position; and, (d) reel drive means for differentially rotating the upper and lower hubs, said reel drive means including motor means mounted below the lower hub, and means extending through the lower hub for releasably coupling the motor means to the depending shaft responsive to pivoting of the panel to the operative position.

2. In a tape transport apparatus, coaxial drive means for tape reels in accordance with claim 1 wherein the releasable coupling means includes:

(a) a drive shaft mounted on the support member and extending upward toward the upper hub;

(b) means connecting the drive shaft to the motor means for rotation thereby;

(c) means on the drive shaft and on the depending shaft for rotationally connecting the drive shaft to the upper hub responsive to pivoting of the panel to the operative position.

3. In a tape transport apparatus, coaxial drive means for tape reels in accordance with claim 2 wherein:

(a) the lower hub is rotatably supported on the drive shaft for rotation independent thereof; and, (b) the drive means includes means connecting the lower hub to the motor means for rotating the lower hub independent of the drive shaft and upper hub.

4. In tape transport apparatus, coaxial drive means for tape reels in accordance with claim 2 wherein the top of the drive shaft and the pivotal axis of the panel are in approximately the same plane perpendicular to the drive shaft axis.

5. In tape transport apparatus, coaxial drive means for tape reels in accordance with claim 4 wherein:

(a) the top of the drive shaft is disposed interior of the lower hub; and, (b) the pivotal panel has means mounted on its underside for cooperating with the lower hub to align the axes of the drive shaft and the depending shaft.

6. In tape transport apparatus, coaxial drive means for tape reels in accordance with claim 1 and further comprising reel hold-down means mounted on the underside of the pivotal panel for engaging a reel on the lower hub responsive to pivoting of the panel to the operative position to rotate with the lower reel and retain it on the hub.

7. A reel stacking and driving mechanism for a tape recorder comprising:

(a) a base support member;

(b) a deck mounted on the upper side of the base;

(c) an elongate cantilevered drive shaft supported on the base for axial rotation and extending through the deck;

(d) a lower reel hub having an axial bore into which the upper end of the drive shaft extends, the upper portion of the bore wall forming a downwardly converging cam surface, the exterior surface of the lower hub including an upper portion for receiving a lower tape reel and an enlarged diameter lower portion for positioning the lower tape reel;

(e) means supporting the lower hub on the drive shaft for axial rotation relative thereto;

(f) a movable support plate above the deck mounted for pivotal movement through an angle of more than 90° between a position away from the lower hub and an operative position overlaying the lower hub, the pivotal axis of the movable plate and the upper end of the drive shaft being in substantially the same plane perpendicular to the drive shaft axis;

(g) a sleeve extending perpendicularly through the movable plate and fixed thereto;

(h) hold-down means mounted on the sleeve below the movable plate for axial rotation relative thereto, the hold-down means having a lower portion adapted to cooperate with the cam surface of the lower hub to substantially align the sleeve axis and the drive shaft axis in the operative position, and an enlarged diameter portion for engaging the upper side of a tape reel on the lower hub;

(i) an upper reel hub mounted on the sleeve above the movable plate for axial rotation relative thereto, the upper hub including a cylindrical portion for receiving an upper tape reel, an enlarged diameter portion for positioning the upper reel, hold-down means for releasably retaining the upper reel on the hub, and a depending shaft extending freely through the sleeve;

(j) cooperating pin and slot means at the upper end of the drive shaft and the lower end of the depending shaft for rotationally coupling the shafts responsive to movement of the movable plate to the operative position;

(k) first motor means mounted below the deck for rotating the lower hub; and, (l) second motor means mounted below the deck for rotating the drive shaft and the upper hub.

References Cited

UNITED STATES PATENTS

| | | | |
|---|---|---|---|
| 1,548,960 | 8/1925 | Stuber et al. | 242—55.14 |
| 2,732,144 | 1/1956 | Jones | 242—55.12 |
| 3,083,925 | 4/1963 | Schoebel | 242—55.13 |

GEORGE F. MAUTZ, *Primary Examiner.*